United States Patent
Wu et al.

(10) Patent No.: US 8,433,279 B2
(45) Date of Patent: Apr. 30, 2013

(54) METHOD OF SENDING AND RECEIVING CALL WITH SPECIFIC REQUEST

(75) Inventors: Hua Wu, Hsinchu County (TW); Ching-Chieh Wang, Yilan County (TW); Wen-Hung Wu, Taipei (TW); Jing-Ru Cheng, Taipei (TW); Shih-Hsin Chien, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 333 days.

(21) Appl. No.: 12/276,410

(22) Filed: Nov. 23, 2008

(65) Prior Publication Data

US 2010/0130159 A1 May 27, 2010

(51) Int. Cl.
*H04M 11/04* (2006.01)
(52) U.S. Cl.
USPC ............... 455/404.1; 455/404.2; 455/415; 455/417; 455/458
(58) Field of Classification Search ............... 455/404.1, 455/404.2, 414.1, 415, 417, 422.1, 433, 435.1, 455/445, 456.1, 456.2, 458, 567
See application file for complete search history.

(56) References Cited

U.S. PATENT DOCUMENTS

| 6,697,473 | B2 * | 2/2004 | Batten ........................... 379/199 |
| 2004/0121768 | A1 | 6/2004 | Maki |
| 2004/0203899 | A1 * | 10/2004 | Curtis et al. ............... 455/456.1 |
| 2005/0101288 | A1 * | 5/2005 | Hulkkonen et al. ....... 455/404.1 |
| 2005/0107129 | A1 * | 5/2005 | Kaewell et al. ............... 455/567 |
| 2005/0197138 | A1 * | 9/2005 | Kaminsky et al. ......... 455/456.1 |
| 2006/0030290 | A1 | 2/2006 | Rudolf |
| 2009/0170528 | A1 * | 7/2009 | Bull et al. .................. 455/456.2 |
| 2010/0075714 | A1 * | 3/2010 | Keskar et al. ............... 455/556.1 |

* cited by examiner

*Primary Examiner* — Temica M Beamer
(74) *Attorney, Agent, or Firm* — Winston Hsu; Scott Margo

(57) ABSTRACT

A specific code indicative of a specific request is used to provide a communication device with an ability to send specific calls, such as emergency calls and silent calls, and the ability to distinguish the specific calls from the received calls. A method of sending a call includes generating a specific code indicative of a specific request, adding the specific code to a call, and then sending the call to a receiver for notifying the receiver of the specific request. A method of receiving a call includes determining whether a received call comprises a specific code indicative of a specific request, and generating an indication in response to the specific request when the received call is determined to comprise the specific code.

24 Claims, 3 Drawing Sheets

METHOD OF SENDING AND RECEIVING CALL WITH SPECIFIC REQUEST

BACKGROUND

The present invention relates to methods of sending and receiving a call, and more particularly, to methods of sending and receiving a call with a specific code indicative of a specific request, such as an emergency code indicative of an emergency request.

Mobile phones are widely used wireless communication devices. As long as a mobile phone is in the service area of a public land mobile network (PLMN) it registers, the user of the mobile phone can be easily reached at any time. This wireless communication technique still has limitations, however; for example, when the mobile phone is not in the service area (i.e. the mobile phone has limited service), the connection is lost. The mobile phone in a limited service area therefore cannot send a call for help or receive potentially urgent calls from other people. Another difficulty is that, when the user is in a noisy place, he/she may miss important calls because the incoming call notification sound is covered by the surrounding noise. Missing emergency calls due to the limited service situation or noisy surroundings is unwelcome and should be solved in order to provide a complete mobile communication service.

SUMMARY

The present invention therefore provides methods of sending and receiving a call with a specific request, such as an emergency request. A communication device (such as a network, a telephone or a mobile phone) applying the method of the present invention can be provided with an ability to send specific calls (such as emergency calls) or to distinguish the specific calls from normal received calls. Moreover, a mobile phone of the present invention can receive calls even in a limited service area. The occurrence of the problems faced by the prior arts such as the missing of emergency calls due to a limited service situation or noisy surroundings can therefore be lowered, and an improved mobile communication service can be achieved.

In another aspect of the present invention, a power saving mode is added in the communication device. When the communication device is operated in the power saving mode, it only receives calls with the specific request and turns off other application programs of the processor in order to optimize the consumption of power. The switching between a normal mode and the power saving mode can be activated by a user or by automatic system settings.

According to one exemplary embodiment of the present invention, a method of processing a call is provided. The method comprises generating a specific code indicative of a specific request, modifying a call according to the specific code, then sending the call to a receiver for notifying the receiver of the specific request, determining whether a received call is a specific request call, and generating an indication in response to the specific request when the received call is determined to be the specific request call.

According to another exemplary embodiment of the present invention, a method of sending a call is provided. The method comprises generating a specific code indicative of a specific request, adding the specific code to a call, and then sending the call to a receiver for notifying the receiver of the specific request.

According to another exemplary embodiment of the present invention, a method of receiving a call is provided. The method comprises determining whether a received call is a specific request call, and generating an indication in response to the specific request when the received call is determined to be the specific request call.

According to another exemplary embodiment of the present invention, a method of receiving a call is provided. The method comprises checking if a service area of a first communication network registered by a receiver covers the receiver; and, when the receiver is not in the service area of the first communication network, updating location information to a second communication network whose service area covers the receiver.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ."

Figure 1:
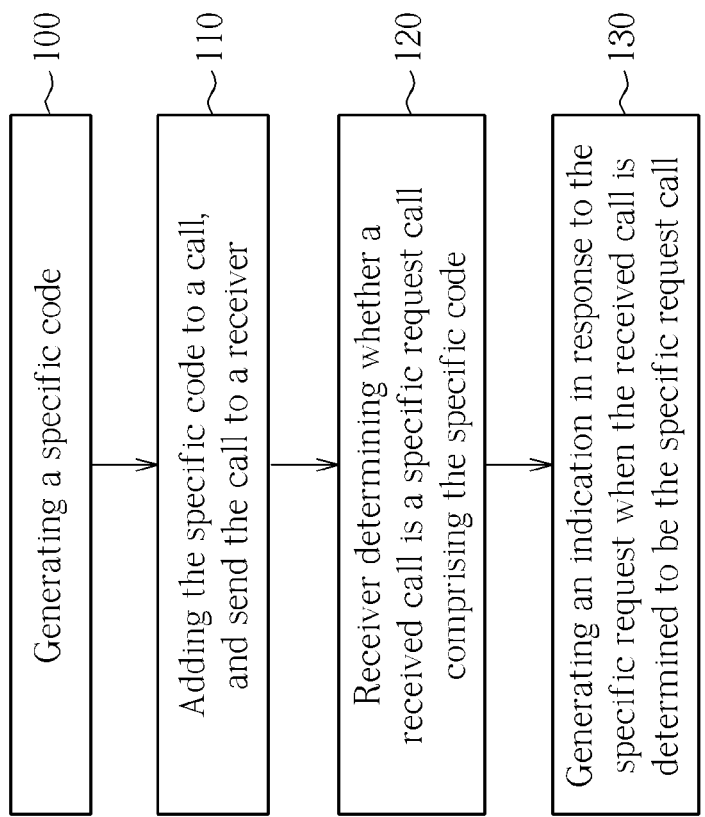
FIG. 1 is a flow chart of sending and receiving a call with a specific request according to one exemplary embodiment of the present invention.

In the following, methods of sending and receiving a call implemented in a communication device, such as a network, a telephone or a mobile phone, are proposed in order to establish a specification for the communication device to send specific calls (such as emergency calls) or to distinguish the specific calls from the received calls. According to one exemplary embodiment shown in FIG. 1, a specific code indicative of a specific request is first generated (Step 100). The specific code is then added or embedded in a call, and the call is sent for notifying a receiver of the specific request (Step 110). When the receiver receives the call, it can distinguish the specific request by determining whether the received call is the specific request call comprising the specific code indicative of the specific request (Step 120). Moreover, the receiver may generate an indication in response to the specific request when the received call is determined to be the specific request call comprising the specific code (Step 130).

Please note that the receiver can be a base station, a telephone or a mobile phone. Therefore, in one embodiment, the originating call with the specific request is received by the base station where the specific code indicative of the specific request is identified, and the base station then sends the call to a target phone (a telephone or a mobile phone) associated with the Mobile Station International Subscriber Directory Number (MSISDN) of the call according to certain communication processes predefined for the specific request between the base station and the telephone/mobile phone (e.g. the base station pages the target phone according to a specific paging strategy such as repeatedly performing the paging). In another embodiment, the base station does not identify the specific code and passes the call to the target phone according to the MSISDN of the call. Instead, the target phone determines whether the call comprises the specific call. After the specific code is identified, the target phone may generate some indications in response to the determined specific code. In one embodiment, when an emergency code is identified, the target phone may adjust volume of an incoming telephone ring, enable a vibration function, or generate other indications that help notify the user of an incoming call with the emergency request. In another embodiment, when a silence mode code is identified, the target phone may lower the volume of the incoming call or enters a silence mode.

The type of specific code is not limited. For example, the specific code can be an index, a specific key sequence (such as '#99#' or any other combinations of keywords '*' and '#' and numbers '0'-'9' on a keyboard of a phone) or a specific information element (IE), which is a part of a frame. The specific IE can be a new IE specially defined for the specific request function, a reserved field, or a defined field (for example, the subaddress field). The user sends the specific key sequence with a phone number associated with the receiver, e.g. #99#+phone number, and the specific key sequence is encoded in the specific IE. When the receiver receives a call comprising the specific key sequence or the specific IE, the receiver can identify the received call as a call with a specific request. Different requests may be represented by different codes; for example, the sequence '#99#' may represent an emergency request, while the sequence '#00#' may represent a control request that request the receiver to configure its setting, e.g. a silence mode request requesting the receiver to enable a silence/mute function.

The phone can have a built-in menu or a functional key representing the specific request function, wherein when the user selects the menu or presses the key while generating a call, the phone automatically adds the specific code to the call. As well as automatic generation by the phone when the user selects the specific request function, the specific key sequence can be a user entered sequence via the phone keyboard. The specific key sequence can be public or private; that is, all users may use the same specific key sequence for notifying the specific request, or a specific phone may design its own key sequence. Moreover, the public key sequence can be recognized by the phone if a password set by the owner of the phone is sent together with the public key sequence in order to prevent inappropriate use of specific request functions.

Because the above-mentioned methods can enable a phone to generate certain indications such as volume adjustment or vibration adjustment to notify the user of a specific call, the problem associated with the prior art where an incoming telephone ring is covered by surrounding noise when the user is in a noisy place, resulting in missing important calls, can be avoided. Moreover, with the help of the silence mode code, the user can make a silent call that is suitable for reaching people in a meeting or at late night. However, the implementations of the specific code are not limited to the above-mentioned embodiments. For example, the specific code also benefits a mobile phone receiving calls even when the mobile phone is not in a service area of a home communication network (i.e. the mobile phone is in a limited service area). By applying the method described in the following paragraphs, the mobile phone in a limited service area can still send or receive a call, and an improved mobile communication service quality is thereby achieved.

In the prior arts, a mobile phone can only update its location information to its home PLMN, which is a reason why the mobile phone can only send and receive calls when it is activated in the service area of the home PLMN. As a result, to enable the mobile phone in a limited service area to be able to receive an incoming call, other PLMNs besides the home and equivalent PLMNs need to accept a location update request sent from the mobile phone, record and send the location information provided by the mobile phone to its home PLMN. Hence, any incoming call can be sent to home PLMN first and transferred to the mobile phone through the other PLMN according to the location information.

Figure 2:
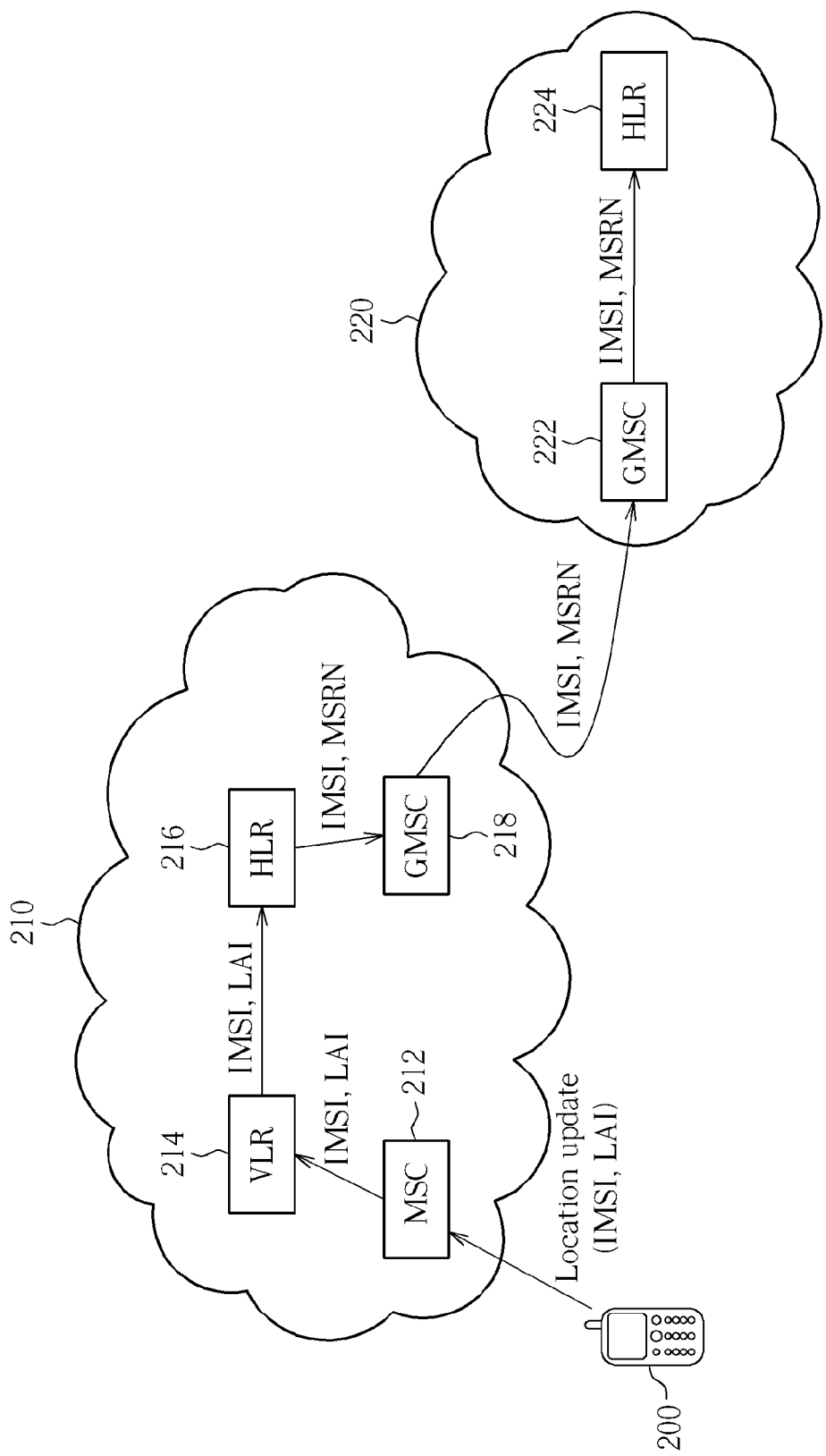
FIG. 2 is a diagram showing a mobile phone updating its location information to a PLMN different from a home PLMN registered by the mobile phone according to one exemplary embodiment of the present invention.

Please refer to FIG. 2, which is a diagram showing a mobile phone 200 updating its location information to a PLMN 210 that is different from a home PLMN 220 that the mobile phone 200 registers. As shown in FIG. 2, the mobile phone 200 is not in the service area of the home PLMN 220 it registers, but is in the service area of a non-allowed PLMN 210. The mobile phone 200 updates its location information to the non-allowed PLMN 210 by sending a location update request comprising a new specific IE for notifying the non-allowed PLMN 210 of a limited-service request. That is, the location update sent from the mobile phone 200 to the non-allowed PLMN 210 comprises an international mobile subscriber identity (IMSI) associated with the mobile phone 200, a location area identity (LAI) identifying location area of the home PLMN 220, and a new specific IE defined for limited-service location update request. For example, this IE can compose one bit to represent whether it is the location update for normal use or for limited service only. When the mobile switching center (MSC) 212 of the non-allowed PLMN 210 receives the location update request and identifies the specific IE, it accepts the location update request and forwards the location information including IMSI and mobile station roaming number (MSRN) of the mobile phone 200 to the gateway mobile switching center (GMSC) 222 of the home PLMN 220 through the visitor location register (VLR) 214, the home location register (HLR) 216 and the GMSC 218 of the non-allowed PLMN 210. The location information including IMSI and MSRN of the mobile phone 200 is then recorded in a database by the HLR 224 of the home PLMN 220. The feature for receiving urgent call (adding the specific IE to the location update request) can be enabled by the user manually or by the mobile phone 200 automatically when the limited service situation is detected.

In another embodiment, when updating the location to the non-allowed PLMN 210 whose service area covers the mobile phone 200, the mobile phone 200 sends a location update request with a specific location update type for notifying the non-allowed PLMN 210 of the limited service request. The IE structure of the location update request in this embodiment does not need to be modified as compared to the above embodiment that adds a new IE to the location update request. Similarly, the non-allowed PLMN 210 detects the specific location update type, and therefore accepts the location update request sent by the mobile phone 200, and forwards the location information contained in the location update request to the home PLMN 220. The home PLMN 220 further records the location information of the mobile phone 220 in the database for future use. Likewise, the specific location update type can be enabled by the user manually or by the mobile phone 200 automatically when the limited service situation is detected.

Figure 3:
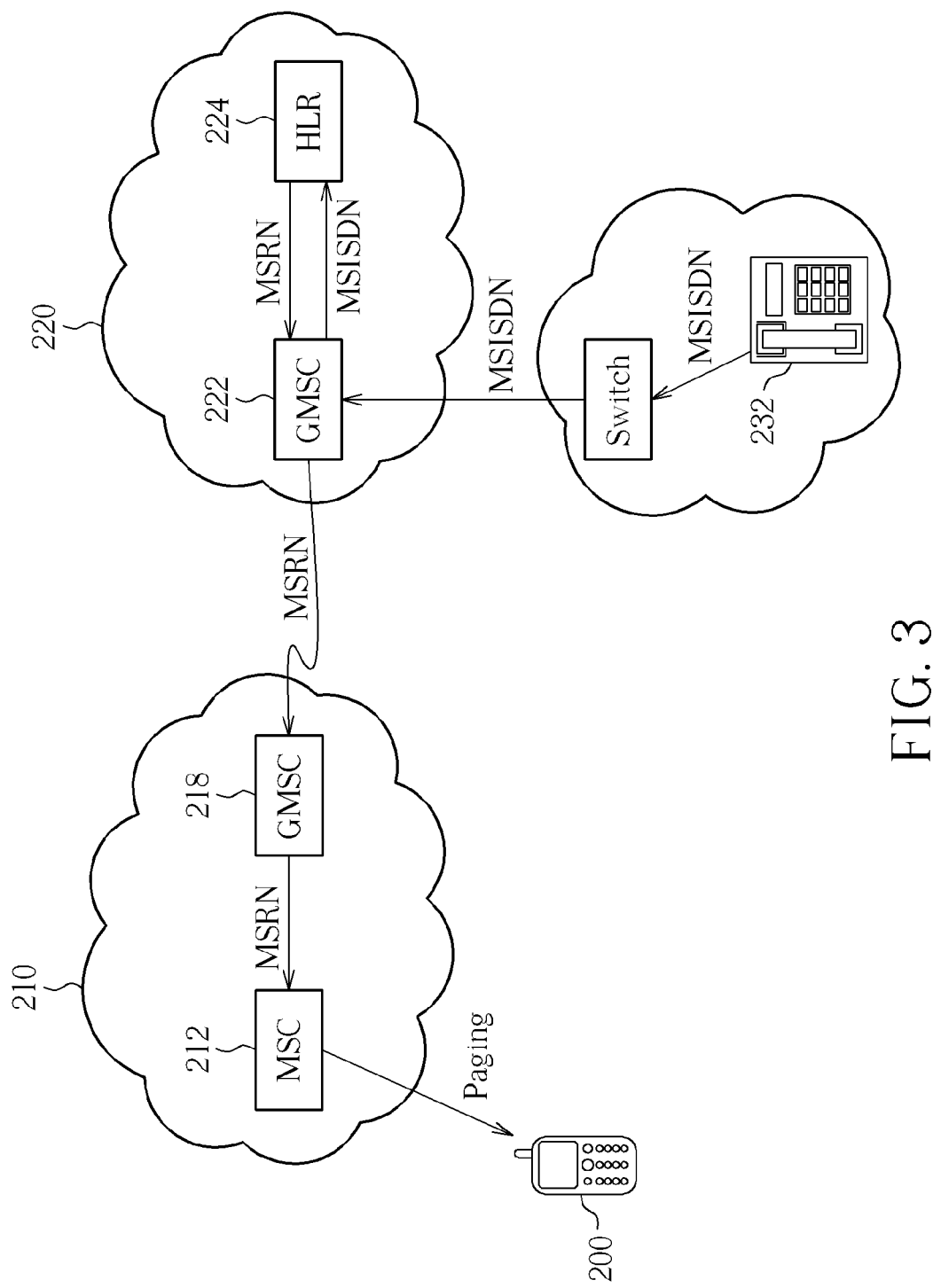
FIG. 3 is a diagram showing paging a mobile phone under a limited service situation according to one exemplary embodiment of the present invention.

Because the home PLMN 220 stores the location information of the mobile phone 200, a call sent to the mobile phone 200 can be transferred to the PLMN 210 whose service area covers the mobile phone 200 from the home PLMN 220, enabling the mobile phone 200 to receive a call even in the limited service situation. Please refer to FIG. 3, which is a diagram showing paging the mobile phone 200 under the limited service situation. A call with a mobile station international subscriber directory number (MSISDN) associated with mobile phone 200 sent from a calling party 232 is delivered to the home PLMN 220 of the mobile phone 200. When receiving the call, the GMSC 222 of the home PLMN 220 searches the database of the HLR 224, and determines a communication network whose service area currently covers the receiver according to the recorded location information (MSRN) of the mobile phone 200. Referring to the recorded MSRN, the home PLMN 220 transfers the received call to the GMSC 218 of the non-allowed PLMN 210, and the MSC 212 of the non-allowed PLMN 210 pages the mobile phone 200. After the mobile phone 200 answers the paging of the MSC 212, the connection between the calling party 232 and the mobile phone 200 is thereby established. The mobile phone 200 in a limited service area can therefore receive calls as a result of the specific limited service location update function.

Moreover, the mobile phone 200 is further provided with a power saving mode in which only circuits corresponding to the network connection are enabled and other circuits, such as application program modules, are disabled for power saving. In one embodiment, when the mobile phone 200 is operated in the power saving mode, it only receives calls with the specific request and turns off other application programs of the processor in order to optimize power consumption. The switching between a normal mode and the power saving mode can be activated by a user or by an automatic system setting (for example, when a low battery is detected).

In case that user may loses the important incoming call when battery is in the low power state, the mobile phone can be switched to receive the urgent call only. In order to achieve the low power consumption, the mobile phone 200 may only listen to the specific paging timing. Since the power consumption of the mobile phone increases as the wake time increases and the opportunity of receiving urgent call shall be not high, the timing period for the mobile phone to listen to the paging shall be not designated too short. For example, one access grant channel (AGCH) block is reserved as a paging block for receiving urgent call users only every several 51 multi-frames under the power saving mode. In this way, the mobile phone 200 only needs to wake up every several 51 multi-frames to listen to the AGCH block. The waking time of the mobile phone 200 can be reduced, and the power consumption can therefore be decreased accordingly. In this embodiment, the operation of the already existing paging channel will not be affected.

To conclude, by introducing a specific code to a call that is indicative of a specific request, a user can be notified of the specific request such as an emergency request, and the prior problems where calls are missed due to a limited service situation or noisy surroundings can therefore be avoided. Moreover, a communication device can enter a power saving mode and only receive those calls with a specific request so that the power consumption can be optimized.

Those skilled in the art will readily observe that numerous modifications and alterations of the device and method may be made while retaining the teachings of the invention.

What is claimed is:

1. A method of processing a call, comprising:
   generating a specific code indicative of a specific request;
   modifying a call according to the specific code, and then sending the call to a receiver for notifying the receiver of the specific request, wherein the modifying step comprises encoding the specific code in a specific information element (IE) of the call which has not been transmitted from a communication device before the call is transmitted to the receiver;
   determining whether a received call is a specific request call; and
   generating an indication in response to the specific request when the received call is determined to be the specific request call.

2. The method of claim 1, wherein the step of modifying the call according to the specific code comprises adding the specific code to the call.

3. The method of claim 1, wherein the specific code is an emergency code indicative of an emergency request.

4. The method of claim 1, wherein the specific code is a silence mode code indicative of a silence request, and the step of generating the indication in response to the specific request comprises:
   the receiver associated with the received call entering a silence mode.

5. A method of sending a call, comprising:
   generating a specific code indicative of a specific request; and
   adding the specific code to a call, and then sending the call to a receiver for notifying the receiver of the specific request;
   wherein the specific code is encoded in a specific information element (IE) of the call which has not been transmitted from a communication device before the call is transmitted to the receiver.

6. The method of claim 5, wherein the specific code corresponds to a specific key sequence, and the step of sending the call to the receiver comprises:
   sending the specific key sequence with a phone number associated with the receiver to thereby send the call to the receiver.

7. A method of receiving a call, comprising:
   determining whether a received call is a specific request call including a specific code that is encoded in a specific information element (IE); and
   generating an indication in response to the specific request when the received call is determined to be the specific request call;
   wherein the specific code is received before notifying a user of the incoming call.

8. The method of claim 7, wherein the step of determining whether the received call is the specific request call comprises determining whether the received call comprises a specific code indicative of a specific request.

9. The method of claim 8, wherein the specific code is an emergency code indicative of an emergency request, and the step of generating the indication in response to the specific request comprises:
   adjusting volume or vibration of the receiver associated with the received call.

10. The method of claim 8, wherein the specific code is a silence mode code indicative of a silence request, and the step of generating the indication in response to the specific request comprises:
    the receiver associated with the received call entering a silence mode.

11. The method of claim 7, wherein a receiver associated with the received call enters a power saving mode in which the receiver only activates circuits in the receiver corresponding to a network connecting at a predetermined frequency.

12. The method of claim 7, wherein a receiver associated with the received call enters a power saving mode, and the method further comprises:
the receiver listening to paging signals at a predetermined frequency lower than a normal paging frequency.

13. The method of claim 12, wherein the predetermined frequency is determined according to a frequency of reserving an access grant channel (AGCH) block as a paging block.

14. The method of claim 7, wherein the step of determining whether the received call is the specific request call is performed in a receiver associated with the received call.

15. The method of claim 7, wherein the step of determining whether the received call is the specific request call is performed by a communication network, and the communication network further pages a receiver associated with the received call by a specific paging mode according to the specific request call.

16. The method of claim 7, further comprising:
when a receiver associated with the received call is not in a service area of a first communication network it registers, transferring the received call from the first communication network to a second communication network.

17. The method of claim 16, further comprising:
when the receiver associated with the received call is not in the service area of the first communication network it registers, updating location information of the receiver to a communication network whose service area covers the receiver.

18. The method of claim 17, wherein the step of updating location information of the receiver to the communication network comprises:
sending a location update request comprising a specific IE for notifying the communication network of a limited-service request;
accepting of the location update request by the communication network; and
forwarding the location information contained in the location update request to the first communication network.

19. The method of claim 18, wherein the step of transferring the received call from the first communication network to the second communication network comprises:
through referring to the location information, determining a communication network whose service area covers the receiver to be the second communication network; and
transferring the received call from the first communication network to the second communication network.

20. The method of claim 17, wherein the step of updating location of the receiver to the communication network whose service area covers the receiver comprises:
sending a location update request with a specific location update type for notifying the communication network of a limited-service request;
accepting of the location update request by the communication network; and
forwarding the location information contained in the location update request to the first communication network.

21. The method of claim 20, wherein the step of transferring the received call from the first communication network to the second communication network comprises:
through referring to the location information, determining a communication network whose service area covers the receiver to be the second communication network; and
transferring the received call from the first communication network to the second communication network.

22. A method of receiving a call, comprising:
activating circuits in a receiver corresponding to a network connection at a first predetermined frequency or listening to paging signals at a second predetermined frequency lower than a normal paging frequency when the receiver enters a power saving mode;
determining whether a received call is a specific request call; and
generating an indication in response to the specific request when the received call is determined to be the specific request call.

23. A method of receiving a call, comprising:
utilizing a communication network to determine whether a received call is a specific request call; and
paging a receiver associated with the received call by a specific paging mode according to the specific request call;
wherein the specific request call has included a specific code before the specific request call is sent to the receiver, and the specific code is inputted into the specific request call which has not been transmitted from a communication device.

24. A method of receiving a call, comprising:
determining whether the call is a specific request call; and
when a receiver associated with the received call is not in a service area of a first communication network, transferring the received call from the first communication network to a second communication network;
wherein the specific request call has included a specific code, and the specific code is received before notifying a user of the incoming call.

* * * * *